Figure 5:
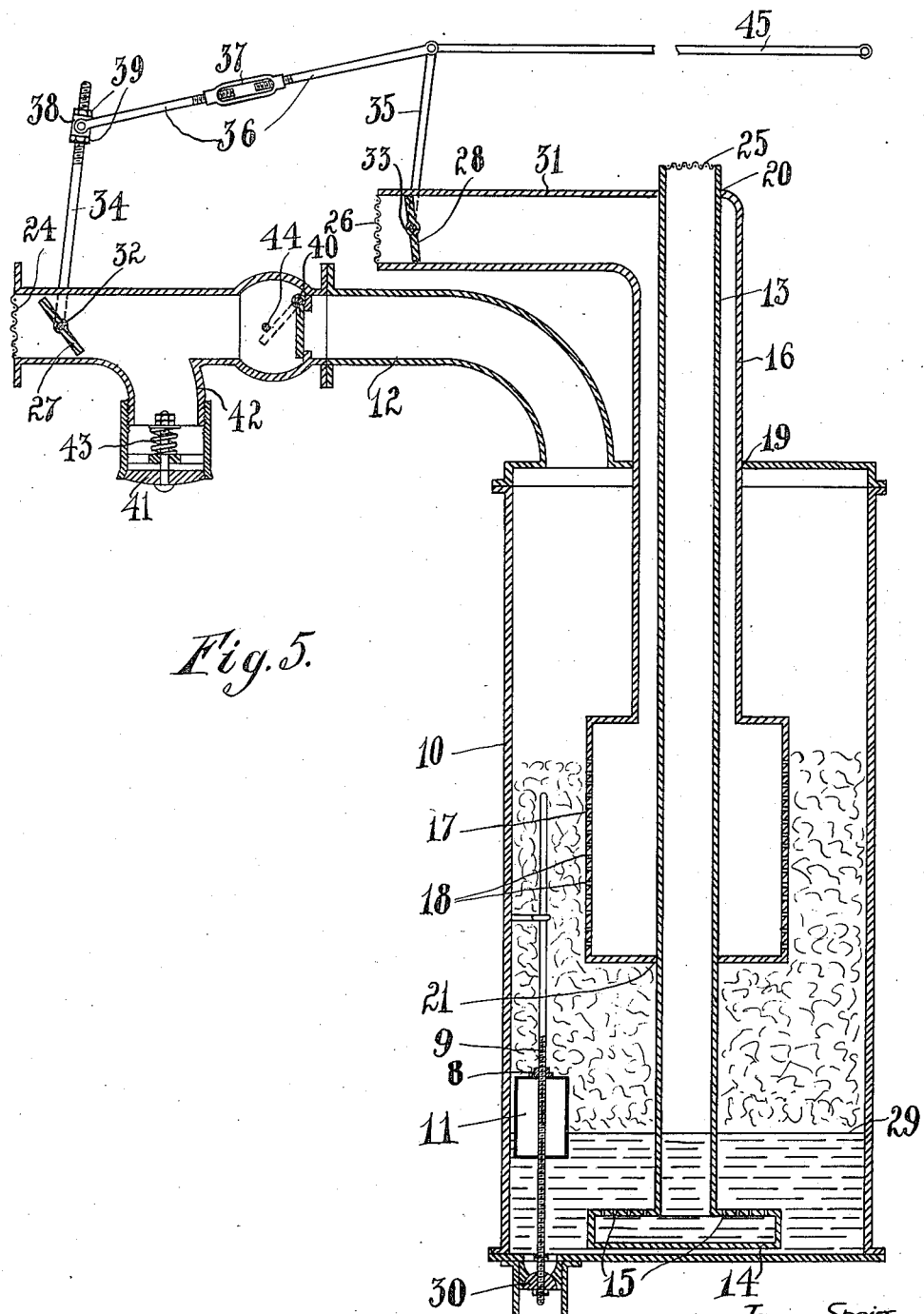

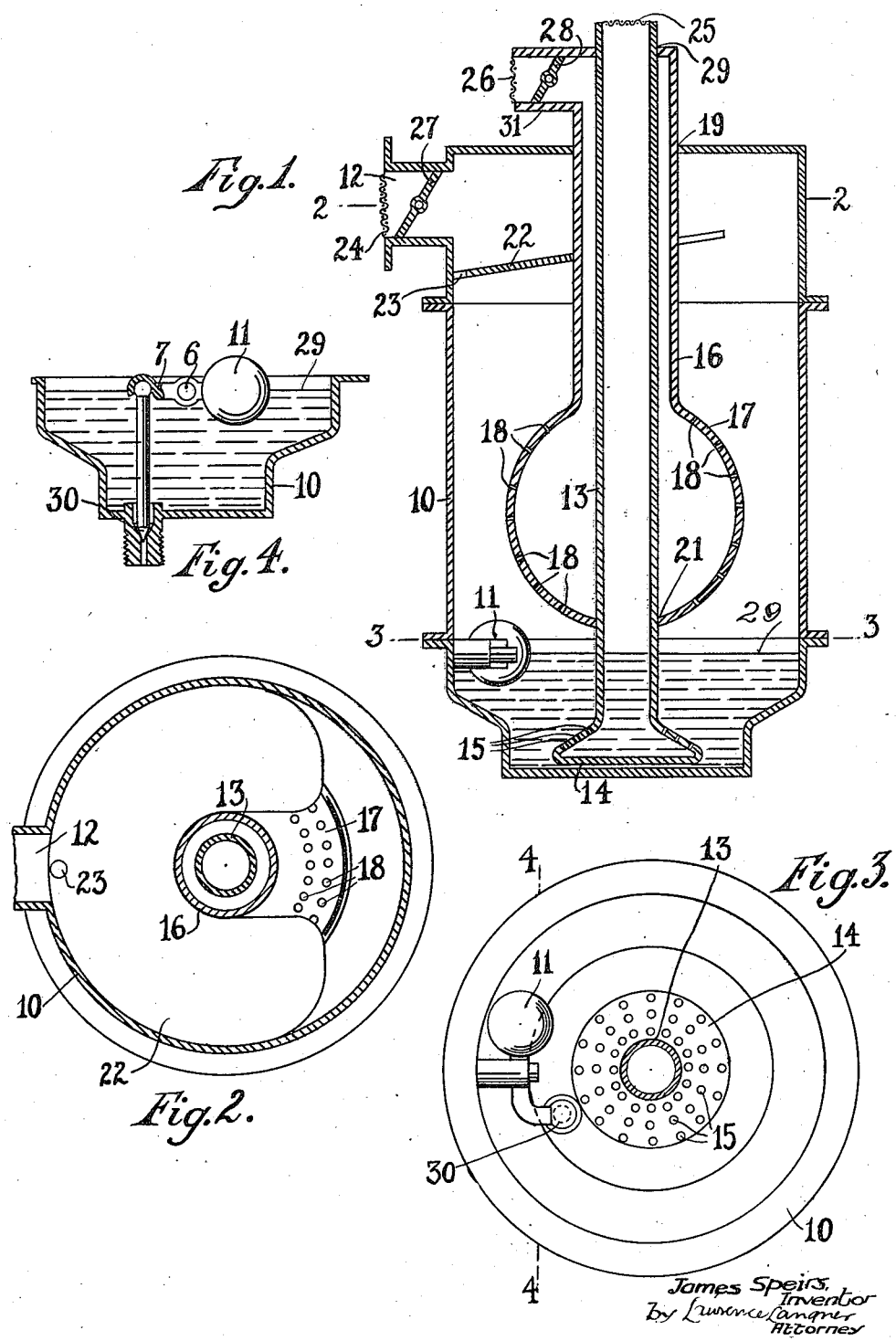

United States Patent Office.

JAMES SPEIRS, OF LONDON, ENGLAND.

CARBURETER.

1,191,097.

Specification of Letters Patent. Patented July 11, 1916.

Application filed August 24, 1915. Serial No. 47,209.

*To all whom it may concern:*

Be it known that I, JAMES SPEIRS, a subject of the King of Great Britain, and resident of 1 Derby street, Kings Cross, in the county of London, England, have invented certain new and useful Improvements in Carbureters, of which the following is a specification.

This invention relates to carbureters of the type wherein part of the air or gas is caused to bubble through the hydrocarbon or volatile liquid, and another part is delivered above the normal liquid level.

It is the object of the invention to construct a carbureter of this type in which there is complete vaporization and effective mixing of the air with the vapor of the volatile liquid in the desired proportions, so that an efficient and economical combustible is obtained.

In the apparatus according to this invention a primary supply of air is passed through the liquid in order to form bubbles which will foam or boil up above or upon the top of the liquid, and an additional or secondary supply of air is so introduced that to a greater or less extent, it carries off these bubbles, bursting them and becoming mixed with the carbureted air within them, while also being itself carbureted by the liquid forming the skin of the bubbles. In order that the apparatus may operate on this principle it is necessary that there should be a relatively constricted space through which the gas and bubbles must rise above the liquid level, and that the additional or secondary air which is introduced by a pipe should pass out through perforations in the walls of an enlargement at or about the point of constriction of the cross-sectional area of the carbureter. The mass of bubbles then rises into the space in question and the secondary air which comes out of the perforations into this space carries off the bubbles with their surface films of liquid and contents of carbureted air. In this way a very effective carburation is obtained, the vaporization being rapid and very complete while effective control of the strength of the mixture is readily provided for.

The invention is primarily applicable for use in carbureting air for internal combustion engines which draw the air directly through the apparatus and into the cylinders by suction action, but it is also applicable as will be obvious for making combustible or illuminating gas mixtures by the carburation of air or other gas with volatile combustible liquids, the gas formed being drawn off and stored for use if required.

In the accompanying drawings are illustrated, in a somewhat diagrammatic form, two examples of construction of the apparatus according to the invention.

Figure 1 is a vertical section according to one example of construction of the apparatus. Fig. 2 is a sectional plan taken on the line 2—2 of Fig. 1. Fig. 3 is a sectional plan taken on the line 3—3 of Fig. 1, and Fig. 4 is a sectional elevation taken on the line 4—4 of Fig. 3. Fig. 5 is a vertical section of an apparatus showing the second example of construction.

The chamber or vessel 10 of the carbureter, Fig. 1 or Fig. 5, is shown as a cylindrical vessel built up in sections which may be detachable. The supply of the volatile liquid to the vessel 10 is controlled by a float 11 connected to a valve 30 as in Figs. 1, 3 and 4, or Fig. 5, for maintaining a supply of the volatile liquid at an approximately constant level in the bottom of the vessel. The surface level of the liquid is indicated at 29 in Figs. 1, 4 and 5. In Figs. 1 to 4 the float is on a lever 7 pivoted at 6, the rear arm of the lever operating the valve 30. In Fig. 5, the float 11 is adjustable by screwing on a rod 9 on which it is locked by a nut 8. The rod 9 raises and lowers the valve 30 directly in this case.

The primary air which is to be bubbled through the liquid is introduced by a pipe 13 which may have a gauze screen 25 at the top to prevent solid particles from being carried through with the air. The pipe 13 terminates below the level of the liquid in a foot piece 14 having an upper surface of approximately conical shape as shown in Fig. 1, or flat as shown in Fig. 5, and formed with perforations at 15 for the escape of the air which is to bubble through the liquid. The foot piece 14 is affixed to the pipe 13 so that it may be taken out with the top section of the vessel when this latter is separated from the lower sections thereof. The holes 15 are of small section, for instance one-fiftieth of an inch in diameter if the carbureter is to be connected directly with an engine such as is used on a motor car of moderate power.

The secondary air supply is introduced through a pipe 16 which in this case surrounds the pipe 13, although it is by no means essential that it should do so. The admission of air to the pipe 16 takes place through a lateral extension 31 at the top thereof, having a throttle or butterfly valve 28 arranged therein for controlling the inflow of air. The inflow opening preferably has a gauze screen 26 to prevent solid particles from being drawn in with the air. The pipe 16 terminates at the bottom in an enlargement 17 which may be approximately spherical as in Fig. 1, or cylindrical as in Fig. 5. This enlargement occupies a considerable portion of the horizontal sectional space in the carbureter vessel so as to have a reduced annular space, and is provided with perforations as indicated at 18 at various points on the surface thereof. The holes 18 are also of small section and they may be of the same section as the holes 15, or even smaller. The enlargement 17 is shown as being soldered or secured in an air-tight manner at its lower end around the pipe 13 as at 21, above the normal liquid level 29 in the vessel 10. The pipe 16 is secured air-tightly as by soldering at 19 to the top section of the vessel, while the pipe 13 is similarly secured at 20 where it passes through the top of the pipe 16.

A shield or baffle-plate 22 (Figs. 1 and 2) may be inserted which will fit around the pipe 16 as shown in Fig. 2 and may have a drain hole as at 23; the baffle 22 is intended to prevent any volatile liquid from splashing or being drawn up through and escaping from the vessel 10 with the carbureted air or gas.

The outlet for the carbureted air or gas is at 12, while the throttle or butterfly valve 27 is provided for controlling the flow through this outlet, and a gauze screen 24 may also be provided primarily with the object of preventing back-firing into the carbureter.

The throttle or butterfly valves 27 and 28 may be connected together for simultaneous operation, by link mechanism as shown in Fig. 5. Upon the spindles 32 and 33 of the valves 27 and 28 are mounted levers 34 and 35 connected together by means of rods 36 having a right and left hand screw coupling 37. The valves are adjusted simultaneously during working through the medium of a rod 45. It is desirable that the valve 27 may stand open slightly while the valve 28 still remains closed, so that some suction of air will take place through the holes 15 and through the liquid, in order to form bubbles before the valve 28 is opened, permitting air to be drawn through the holes 18. An adjustment for this purpose is effected by the screw coupling 37. The adjustment also of a block 38, which is locked in position on lever 34 by means of nuts 39, serves to control the degree of opening of valve 27 relatively to that of valve 28, for further movements thereof.

The mechanism shown for interconnecting the valves 27 and 28 is intended to serve as an example of construction only.

In order to prevent the gases from blowing back into the carbureter in case of back-fire in the engine, a non-return valve such as a flap valve 40 may be arranged, as in Fig. 5, in the outflow pipe 12. This valve can only open as far as is permitted by the stop 44, and is closed by a backward rush of gas in pipe 12, but it opposes no great resistance to the flow of gases forward in the pipe. A branch pipe 42 is then provided, with a safety valve 41 thereon adapted to open outward when a back-fire occurs, but normally held against its seat by a spring 43.

The air supplied to the carbureter may be drawn from the atmosphere or it may be heated if desired to facilitate vaporization.

If any grit or foreign matter enters the carbureter chamber 10, it will collect at the bottom and will not interfere with the action of the carbureter, while the carbureter may be worked even under water so long as the air supply and outlet pipes open above the water level.

Having thus described my invention what I claim as new and desire to secure by Letters Patent is:—

1. A carbureter comprising a vessel, means for maintaining a supply of liquid therein at a constant level, a primary air inlet pipe leading into said vessel and terminating near the bottom thereof in a perforated portion below the liquid level, a perforated chamber occupying the middle portion of the interior of said vessel above the liquid level and means for maintaining a secondary air supply to said chamber, said perforated chamber being of such size relatively to the size of the surrounding vessel as to leave a reduced annular space around the same in the vessel, whereby bubbles caused by the primary air supply are caused to pass up around the perforated chamber and to come in contact with the secondary air supply issuing from the perforations of said chamber, and an outlet for the resultant mixture from the upper part of said vessel.

2. A carbureter comprising a vessel, means for maintaining a supply of liquid therein at a constant level, a primary air inlet pipe leading into said vessel and terminating near the bottom thereof in a perforated portion below the liquid level, a perforated chamber occupying the middle portion of the interior of said vessel above the liquid level and means for maintaining a secondary air supply to said chamber, said perforated chamber being of such size relatively to the size of the surrounding vessel as to leave a reduced annular space around the same in the vessel, whereby bubbles caused by the primary air supply are caused to pass up around the perforated chamber and to come in contact with the secondary air supply issuing from the perforations of said chamber, an outlet for the resultant mixture from the upper part of said vessel, and adjustable means for controlling the secondary air supply and the outflow of the mixture respectively.

3. A carbureter comprising a vessel and means for maintaining a supply of liquid at a constant level therein, a primary air inlet pipe leading down the middle of said vessel nearly to the bottom thereof, a perforated foot-piece on said pipe below the liquid level, a secondary air supply pipe surrounding said primary air inlet pipe and a perforated enlargement on said secondary air supply pipe above the liquid level, said enlargement leaving a narrow annular space between it and the wall of the vessel into which space the bubbles formed in the liquid by the primary air supply may rise, an outlet pipe at the upper part of said vessel for the resultant mixture, and means for controlling the proportion of secondary air relative to the primary air in the mixture.

JAMES SPEIRS.